US012557734B2

(12) United States Patent
Stengele et al.

(10) Patent No.: US 12,557,734 B2
(45) Date of Patent: Feb. 24, 2026

(54) CHOPPING BLADE OF A FORAGE HARVESTER AND METHOD FOR PRODUCING SAID CHOPPING BLADE

(71) Applicant: CLAAS Saulgau GmbH, Bad Saulgau (DE)

(72) Inventors: Martin Stengele, Sauldorf (DE); Christian Spachtholz, Ebenweiler (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 655 days.

(21) Appl. No.: 17/976,484

(22) Filed: Oct. 28, 2022

(65) Prior Publication Data

US 2023/0142637 A1 May 11, 2023

(30) Foreign Application Priority Data

Nov. 5, 2021 (DE) .......................... 102021128822.3

(51) Int. Cl.
A01D 43/08 (2006.01)
(52) U.S. Cl.
CPC .................................... A01D 43/08 (2013.01)
(58) Field of Classification Search
CPC ...................................................... A01D 43/08
See application file for complete search history.

(56) References Cited

U.S. PATENT DOCUMENTS 8,146,849 B2 4/2012 Bacon
2014/0311114 A1 10/2014 Helge et al.

FOREIGN PATENT DOCUMENTS

CA 2242566 A1 * 2/1999 ............. A01F 29/09
DE 225323 A1 * 7/1985 ............. A01F 29/06
(Continued)

OTHER PUBLICATIONS

Translation of DD-225323-A1 (Year: 1985).*
(Continued)

*Primary Examiner* — Claude J Brown

(57) ABSTRACT

Chopping blade (10), having a basic body (11), which has a fastening portion (12) for fastening said chopping blade to a chopping drum and a cutting portion (13) which is angled in relation to the fastening portion, and having a crop-guiding element (15) which is fastened to the fastening portion (12) and is intended for guiding chopped harvested crop, wherein a guide surface (16) of the crop-guiding element (15) has a curved contour. A distance (a) between the beginning of the guide surface (16) of the crop-guiding element (15) and a transition edge (14) between the fastening portion (12) and the cutting portion (13) of the basic body (11) is between 4 mm and 8 mm. The guide surface (16) runs rectilinearly in a first portion (18) with a length (b) between 4 mm and 8 mm, wherein said first portion (18) encloses an angle (α) between 18° and 22° with the fastening portion (12). The first portion (18) merges into a concavely curved second portion (19), the radius of curvature (Rx) of which is between 21 mm and 25 mm and which has a wrap angle (β) between 29° and 33°. The second portion merges into a concavely curved third portion (20), the radius of curvature (Ry) of which is between 18 mm and 22 mm and which has a wrap angle (γ) between 24° and 28°. The third portion merges into a convexly curved fourth portion (21). A maximum height of the crop-guiding element is between 24 mm and 30 mm.

11 Claims, 5 Drawing Sheets

(56)    References Cited

FOREIGN PATENT DOCUMENTS

| DE | 8813953 | U1 |   | 1/1989 |   |          |
|----|---------|-----|---|--------|---|----------|
| DE | 4007794 | A1 | * | 9/1991 | .......... | A01F 29/095 |
| DE | 19650058 | A1 | * | 6/1998 | .......... | A01F 29/095 |
| DE | 19918553 | A1 | * | 10/2000 | .......... | A01F 29/095 |
| DE | 202009009788 | U1 | * | 2/2010 | .......... | A01D 43/085 |
| DE | 102009046808 | A1 | * | 5/2011 | .......... | A01F 29/095 |
| DE | 102012102551 | A1 | * | 9/2013 | ............ | A01F 29/09 |
| DE | 102015120564 | A1 | * | 6/2017 | .......... | A01D 43/085 |
| DE | 102016222167 | A1 | * | 12/2017 | ............ | A01D 43/08 |
| DE | 102016123174 | A1 | * | 5/2018 | ............ | A01F 29/09 |
| DE | 102018216320 | A1 | * | 3/2020 | .......... | A01D 43/085 |
| EP | 0153621 | A1 | * | 9/1985 | ............ | A01F 29/09 |
| EP | 0683971 | A1 | * | 11/1995 | .......... | A01F 29/095 |
| EP | 3329765 | A1 |   | 6/2018 |   |          |
| EP | 3915356 | A1 | * | 12/2021 | .......... | A01F 29/095 |
| FR | 2638604 | A1 | * | 5/1990 | .......... | A01F 29/095 |

OTHER PUBLICATIONS

English Translation of EP-0153621-A1 (Year: 1985).*
English Translation of DE-4007794-A1 (Year: 1991).*
English Translation of EP-0683971-A1 (Year: 1995).*
English Translation of DE-19650058-A1 (Year: 1998).*
English Translation of CA-2242566-A1 (Year: 1999).*
English Translation of DE-19918553-A1 (Year: 2000).*
English Translation of DE-202009009788-U1 (Year: 2010).*
English Translation of DE-102009046808-A1 (Year: 2011).*
English Translation of DE-102012102551-A1 (Year: 2013).*
English Translation of DE-102015120564-A1 (Year: 2017).*
English Translation of DE-102016222167-A1 (Year: 2017).*
English Translation of DE-102016123174-A1 (Year: 2018).*
English Translation of DE-102018216320-A1 (Year: 2020).*

* cited by examiner

CHOPPING BLADE OF A FORAGE HARVESTER AND METHOD FOR PRODUCING SAID CHOPPING BLADE

The invention relates to a chopping blade of a forage harvester. Furthermore, the invention relates to a method for producing a chopping blade of a forage harvester.

EP 3 329 765 A1 discloses a chopping blade of a forage harvester, having a basic body and having at least one crop-guiding element fastened to the basic body. The basic body has a fastening portion for fastening the chopping blade to a chopping drum and a cutting portion which is angled in relation to the fastening portion and is intended for the harvested crop to be chopped. The respective crop-guiding element is fastened to the fastening portion of the basic body and serves for guiding chopped harvested crop. A guide surface of the crop-guiding element has a curved contour. The curved contour of the crop-guiding element begins at a distance from a transition edge between the fastening portion and the cutting portion of the basic body. The chopping blade which is known from EP 3 329 765 A1 is designed in respect of fastening of same to the chopping drum. This gives rise to problems in the guiding of the chopped harvested crop. There is a need for a chopping blade which optimally conducts or guides the chopped harvested crop.

Taking this as the starting point, the present invention is based on the object of providing a novel chopping blade of a forage harvester and a method for producing the chopping blade.

This object is achieved by a chopping blade of a forage harvester according to claim 1.

According to the invention, the distance between the beginning of the guide surface of the respective crop-guiding element and the transition edge between the fastening portion and the cutting portion of the basic body is between 4 mm and 8 mm.

The guide surface of the respective crop-guiding element runs, according to the invention, rectilinearly with a length between 4 mm and 8 mm in a first portion of the crop-guiding element, which portion adjoins the beginning of the guide surface, wherein the first portion of the respective crop-guiding element encloses an angle between 18° and 22° with the fastening portion of the basic body.

The first portion of the respective crop-guiding element merges, according to the invention, into a concavely curved second portion, the radius of curvature of which is between 21 mm and 25 mm and which has a wrap angle between 29° and 33°.

The second portion of the respective crop-guiding element merges, according to the invention, in a concavely curved third portion, the radius of curvature of which is between 18 mm and 22 mm and which has a wrap angle between 24° and 28°.

The third portion of the respective crop-guiding element merges, according to the invention, into a convexly curved fourth portion.

A maximum height of the respective crop-guiding element with respect to the fastening portion of the basic body is, according to the invention, between 24 mm and 30 mm. The fourth portion of the crop-guiding element preferably merges into a fifth portion which defines the maximum height of the crop-guiding element.

The distance between the beginning of the guide surface of the respective crop-guiding element and the transition edge of the basic body, the length of the first portion of the guide surface of the respective crop-guiding element, the radii of curvature and wrap angles of the concavely curved second and third portions of the guide surface of the respective crop-guiding element, the convexly curved fourth portion and the height of the respective crop-guiding element, as measured from the fastening portion of the basic body, in combination with one another permit optimum guidance of the chopped harvested crop. The optimum guidance and deflection of the chopped harvested crop makes it possible to save on energy in the conveying process since the deflection of the chopped harvested crop is associated with little acceleration work.

Furthermore, by means of the above combination of features, the harvested crop is deflected in a defined region of one revolution of the chopping drum, thus reducing the circulation of the harvested crop in the region of the chopping drum.

Accordingly, the above combination of features is optimized in terms of flow and reduces the energy requirement necessary for the flow of harvested crop. The harvested crop is conveyed with a high degree of efficiency for a wide variety of harvested crops, cut length and throughput rates.

The fourth portion of the respective crop-guiding element preferably has a radius of curvature between 5 mm and 7 mm, wherein the fifth portion of the respective crop-guiding element runs parallel to the fastening portion. This serves for further optimizing the guidance of the harvested crop.

The fifth portion of the respective crop-guiding element preferably merges into a rectilinearly running sixth portion which encloses an angle between 23° and 27° with the fastening portion. The guidance of the harvested crop can thereby also be further optimized.

The respective crop-guiding element is preferably closed by portions adjoining the sixth portion. This advantageously prevents harvested crop from accumulating on the trailing blade edge. Accumulations may lead to an imbalance. This feature therefore also serves for further optimizing the guidance of the harvested crop.

The respective crop-guiding element is preferably a roll profiling element. During roll profiling, surfaces are hardened, thus making it possible to provide increased hardness for the respective crop-guiding element. The susceptibility of same to wear can thereby be reduced.

The first portion, the second portion and the third portion of the respective crop-guiding element preferably bear a wear-protection coating. The susceptibility of the respective crop-guiding element to wear can thereby also be reduced.

Preferred developments of the invention emerge from the dependent claims and the description below. Exemplary embodiments of the invention, without being restricted thereto, will be explained in more detail with reference to the drawing, in which:

Figure 1:
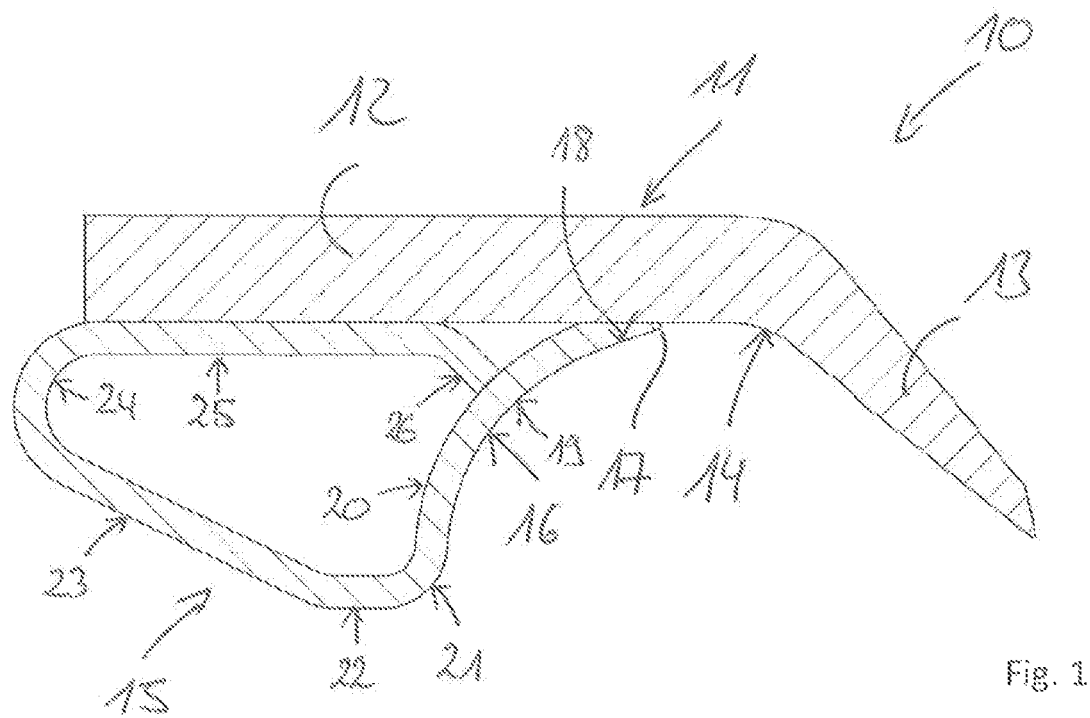
FIG. 1 shows a cross section through a chopping blade according to the invention.
Figure 2:
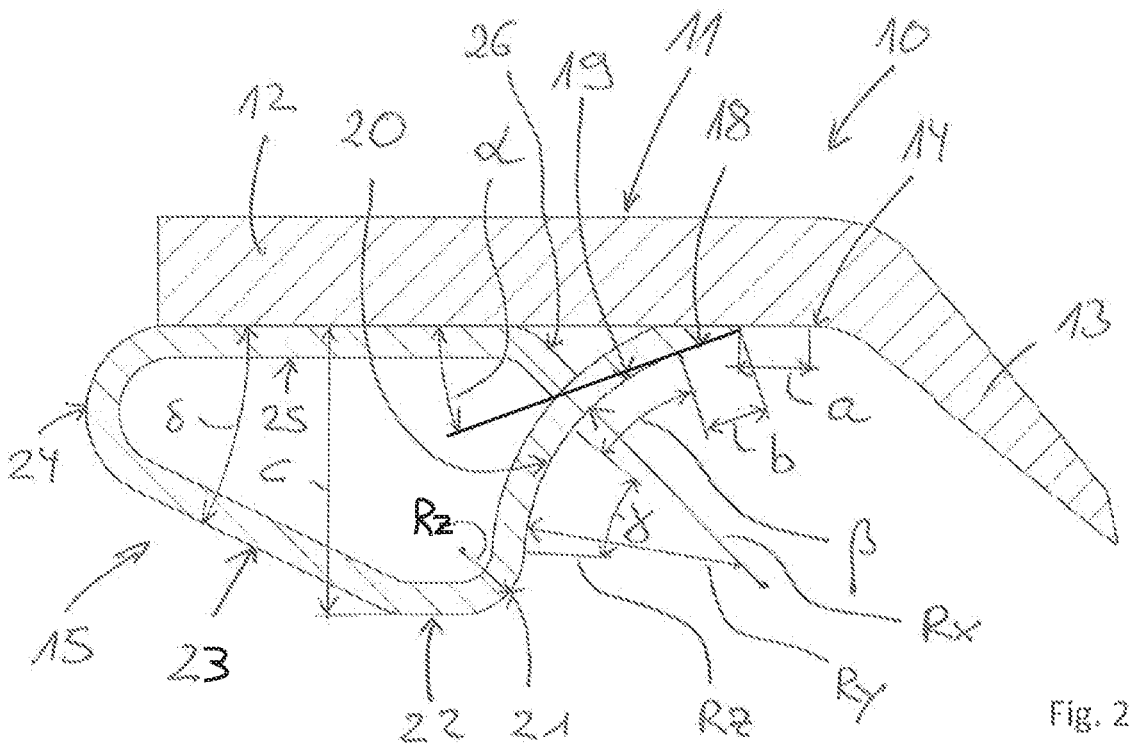
FIG. 2 shows the cross section of FIG. 1 together with geometrical sizes.

FIG. 1 shows a cross section through a chopping blade 10 according to the invention. The chopping blade 10 according to the invention has a basic body 11 and at least on crop-guiding element 15.

The basic body 11 of the chopping blade 10 has a fastening portion 12 for fastening the chopping blade 10 to a chopping drum, not shown, and a cutting portion 13 which is angled in relation to the fastening portion 12 and is intended for cutting the harvested crop to be chopped.

The cutting portion 13 of the basic body 11 of the chopping blade 10 is angled in relation to the fastening portion 12 of the basic body 11.

A transition edge 14 in the form of a bending edge is formed between the fastening portion 12 and the cutting portion 13 of the basic body 11 of the chopping blade 10.

As already explained, the chopping blade 10 is fastenable to a chopping drum, not shown, via the fastening portion 12. For this purpose, the fastening portion 12 is provided with fastening elements which are not shown, are preferably in the form of elongated holes and via which the chopping blade 10, specifically the basic body 11 thereof, can be fastened to the chopping drum.

At least one crop-guiding element 15 is fastened to the fastening portion 12 of the basic body 11. The crop-guiding element 15 has a guide surface 16 for chopped harvested crop, the guide surface 16 having a curved contour at least in sections. The guide surface 16 is curved concavely inward here in section.

The guide surface 16 of the crop-guiding element 15 has a front edge 17 at which the guide surface 16 begins. This edge 17 of the guide surface 16 of the crop-guiding element 15 is at a distance a from the transition edge 14 between the fastening portion 12 and the cutting portion 13 of the basic body 11.

According to the invention, the distance a between the beginning of the guide surface 16 of the crop-guiding element 15, i.e. the edge 17, and the transition edge 14 between the fastening portion 12 and the cutting portion 13 of the basic body 11 is between 4 mm and 8 mm, i.e. 6 mm±2 mm.

The guide surface 16 of the crop-guiding element 15 runs rectilinearly, according to the invention, in a first portion 18 adjoining the edge 17, specifically along a length b which is between 4 mm and 8 mm, i.e. 6 mm±2 mm. Said first portion 18 of the crop-guiding element 15 encloses an angle α between 18° and 22°, i.e. 20°±2°, with the fastening portion 12 of the basic body 11.

Said first portion 18 of the guide surface 16 of the crop-guiding element 15 merges, according to the invention, into a concavely curved second portion 19, specifically continuously and thus tangentially, the second portion 19 having a radius of curvature Rx between 21 mm and 25 mm, i.e. 23 mm±2 mm, and a wrap angle β between 29° and 33°, i.e. 31°±2°.

Said second portion 19 of the guide surface 16 of the crop-guiding element 15 merges, according to the invention, into a concavely curved third portion 20, specifically again continuously or tangentially, the concavely curved third portion 20 having a radius of curvature Ry between 18 mm and 22 mm, i.e. 20 mm±2, and a wrap angle γ between 24° and 28°, i.e. 26°±2°.

The radius of curvature Rx of the concavely curved second portion 19 of the guide surface 16 of the crop-guiding element 15 is greater than the radius of curvature Ry of the concavely curved third portion 20 of the guide surface 16 of the crop-guiding element.

Furthermore, the wrap angle β of the concavely curved second portion 19 is greater than the wrap angle γ of the concavely curved third portion 20.

The concavely curved third portion 20 of the guide surface 16 of the crop-guiding element 15 merges, according to the invention, into a convexly curved fourth portion 21, said fourth portion 21 of the crop-guiding element 15 preferably merging into a fifth portion 22 which preferably determines the maximum height c of the crop-guiding element 15, as measured from the fastening portion 12 of the basic body 11.

Said maximum height c of the crop-guiding element 15 is, according to the invention, between 24 mm and 30 mm, i.e. 27 mm±3 mm.

The above parameters of the chopping blade 10 permit an optimum guidance of the harvested crop flow. The harvested crop is guided with little acceleration work, thus making it possible to save on energy for the conveying process. The circulation of the harvested crop, i.e. the time during which the harvested crop is guided on the chopping blade 10 in the region of the respective crop-guiding element 15 and therefore within the chopping drum, can be reduced. The guidance of the harvested crop can be undertaken in an ideal way for a wide variety of harvested crops, cut lengths and throughput rates by means of the above geometrical sizes.

The fourth portion 21 of the crop flow element 15 preferably has a radius of curvature Rz between 5 mm and 7 mm, i.e. 6 mm±1 mm. This also serves for the optimum guidance of the harvested crop.

The fifth portion 22 of the crop-guiding element 15 merges, preferably continuously or tangentially, into a rectilinearly running sixth portion 23, said sixth portion 23 enclosing an angle δ between 23° and 27°, i.e. 25°±2°, with the fastening portion 12 of the basic body 11. This is also of advantage in respect of optimum guidance of the harvested crop.

The crop-guiding element 15 is designed to be closed by means of portions 24, 25 and 26 adjoining the sixth portion 23. The sixth portion 23 of the crop-guiding element 15 thus merges into a convexly curved seventh portion 24 and the seventh portion 24 into a rectilinearly running eighth portion 25 which is adjacent to the fastening portion 12 of the basic body 11 and via which the respective crop-guiding element 15 is preferably connected to the fastening portion 12 of the basic body 11.

Said eighth portion 25 merges into a ninth portion 26 which, at its end facing away from the eighth portion 25, makes contact with the second portion 19 of the guide surface 16 of the crop-guiding element 15.

The ninth portion 26 and the second portion 19 of the crop-guiding element 15 are interconnected in an integrally bonded manner here preferably by means of welding. Said welded connection is preferably formed by laser welding.

Figures 3, 4:
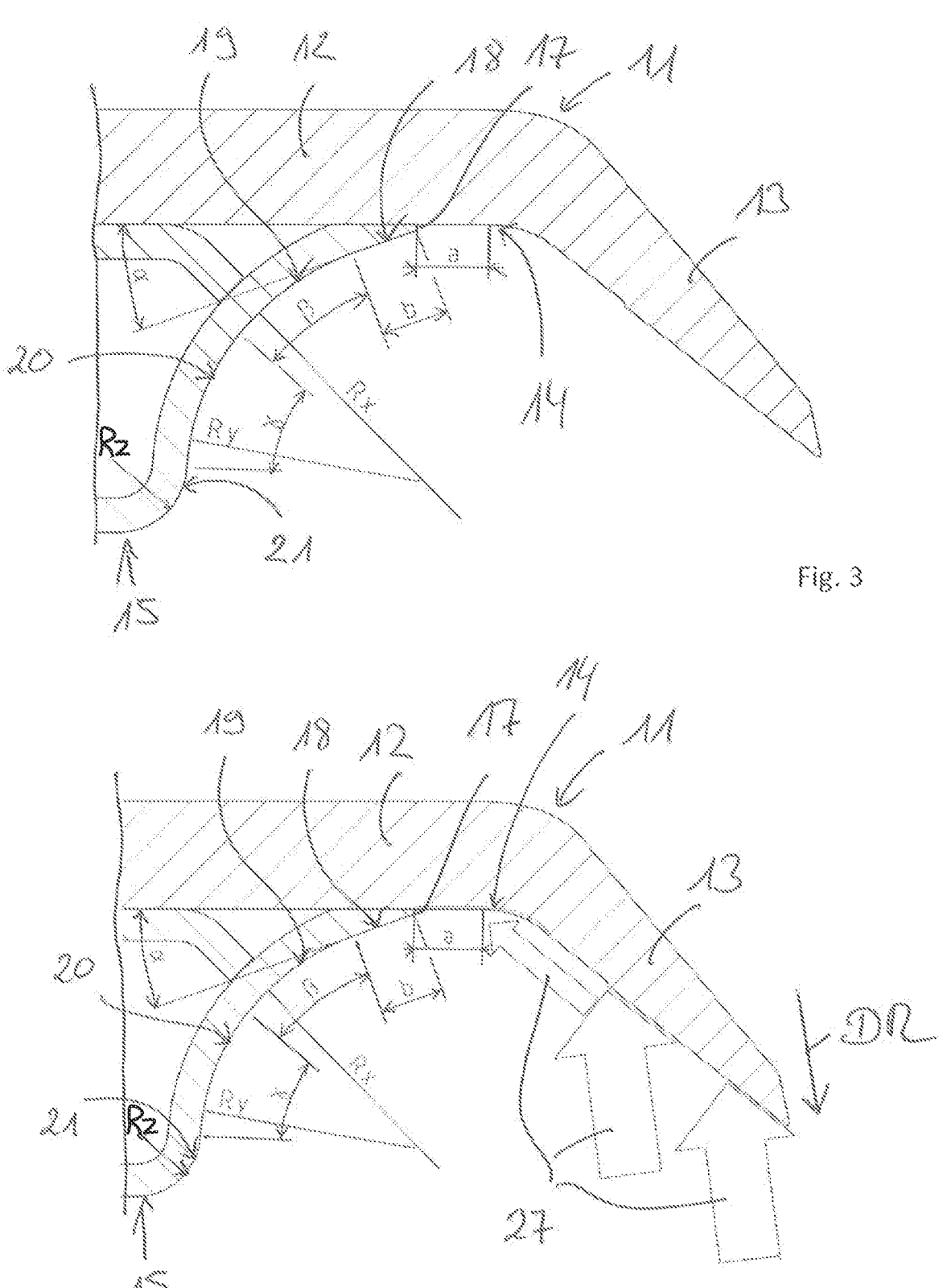
FIG. 3 shows a detail from FIG. 2.
FIG. 4 shows the detail of FIG. 3 together with crop flow arrows.

FIG. 4 visualizes, with reference to the arrows 27, the advantageous effect of the size of the distance a between the edge 17 of the guide surface 16 of the crop-guiding element 15 and the transition edge 14 of the basic body 11 for guiding the harvested crop. The chopped harvested crop is first deflected in the transition region between the cutting portion 13 and the fastening portion 12 of the basic body 11. This is of advantage both in respect of the guidance of the harvested crop and in respect of a reduction in wear.

Even in the event of a worn cutting portion 13 and longer cut lengths, the chopped harvested crop does not strike against the crop flow element 15. The distance a is selected here in such a manner that the chopped harvested crop is not conveyed too far into what is referred to as a turning circle of the chopping drum.

Figure 5:
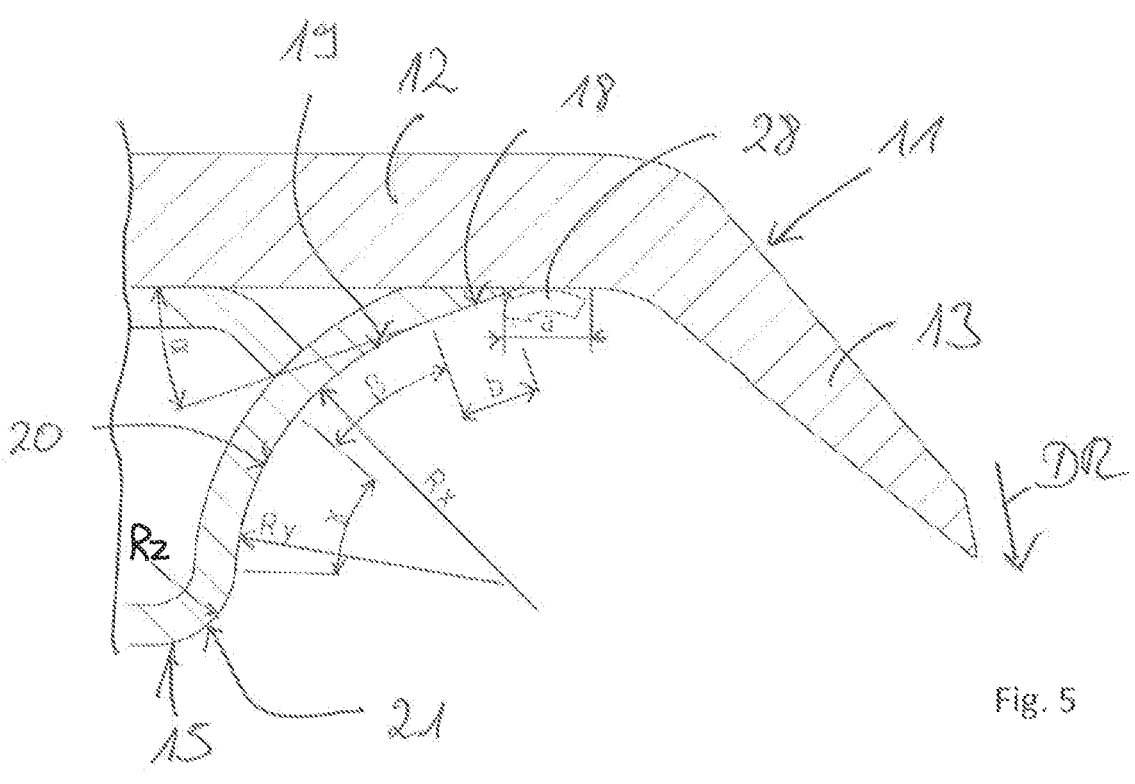
FIG. 5 shows the detail of FIG. 3 together with further crop flow arrows.
Figure 6:
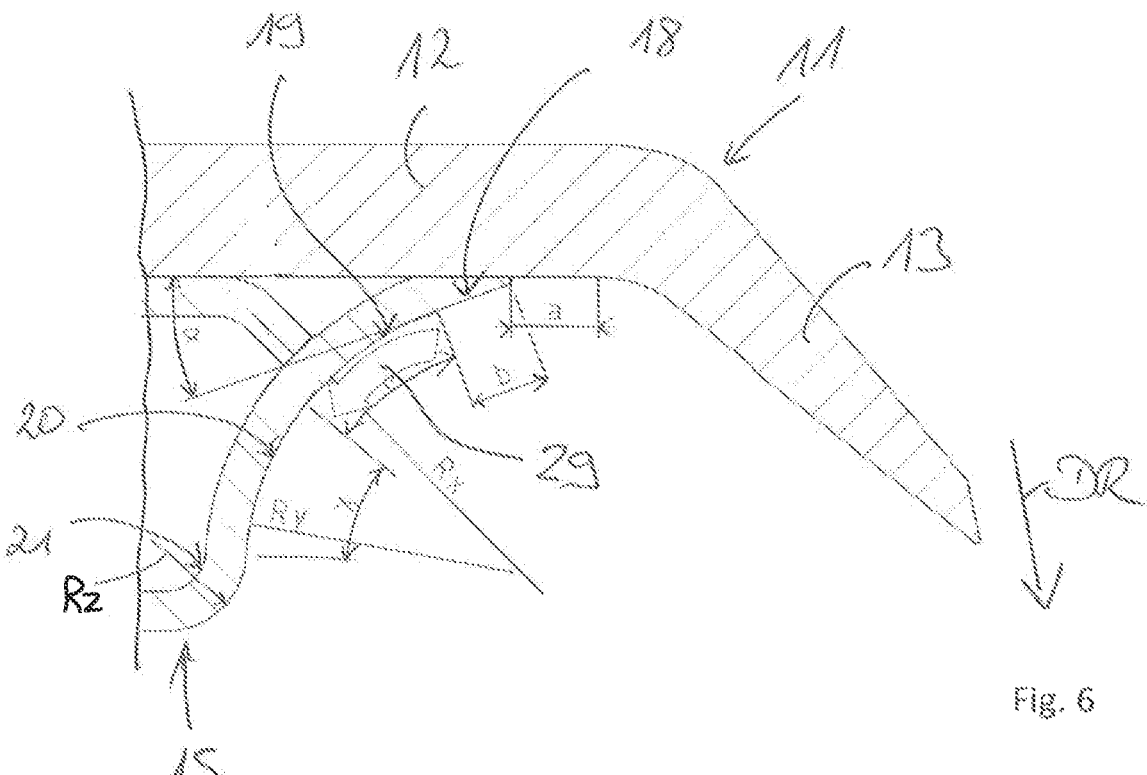
FIG. 6 shows the detail of FIG. 3 together with further crop flow arrows.

FIG. 5 visualizes, by way of an arrow 28, the guidance of the cut harvested crop at the transition into the first portion 18 of the guide surface 16 of the crop-guiding element 15. The relatively shallow angle α causes a further deflection of the cut harvested crop onto the crop flow element 15, wherein, according to FIG. 6, the harvested crop subsequently passes in the direction of the arrow 29 into the second portion 19 of the guide surface 16 of the crop-guiding element 15. The concavely curved portion 19 causes a further deflection of the chopped harvested crop in the direction of rotation DR of the chopping drum, with the chopped crop-guiding element 15 accelerating the harvested crop in the direction of rotation DR of the chopping drum.

Figures 7, 8:
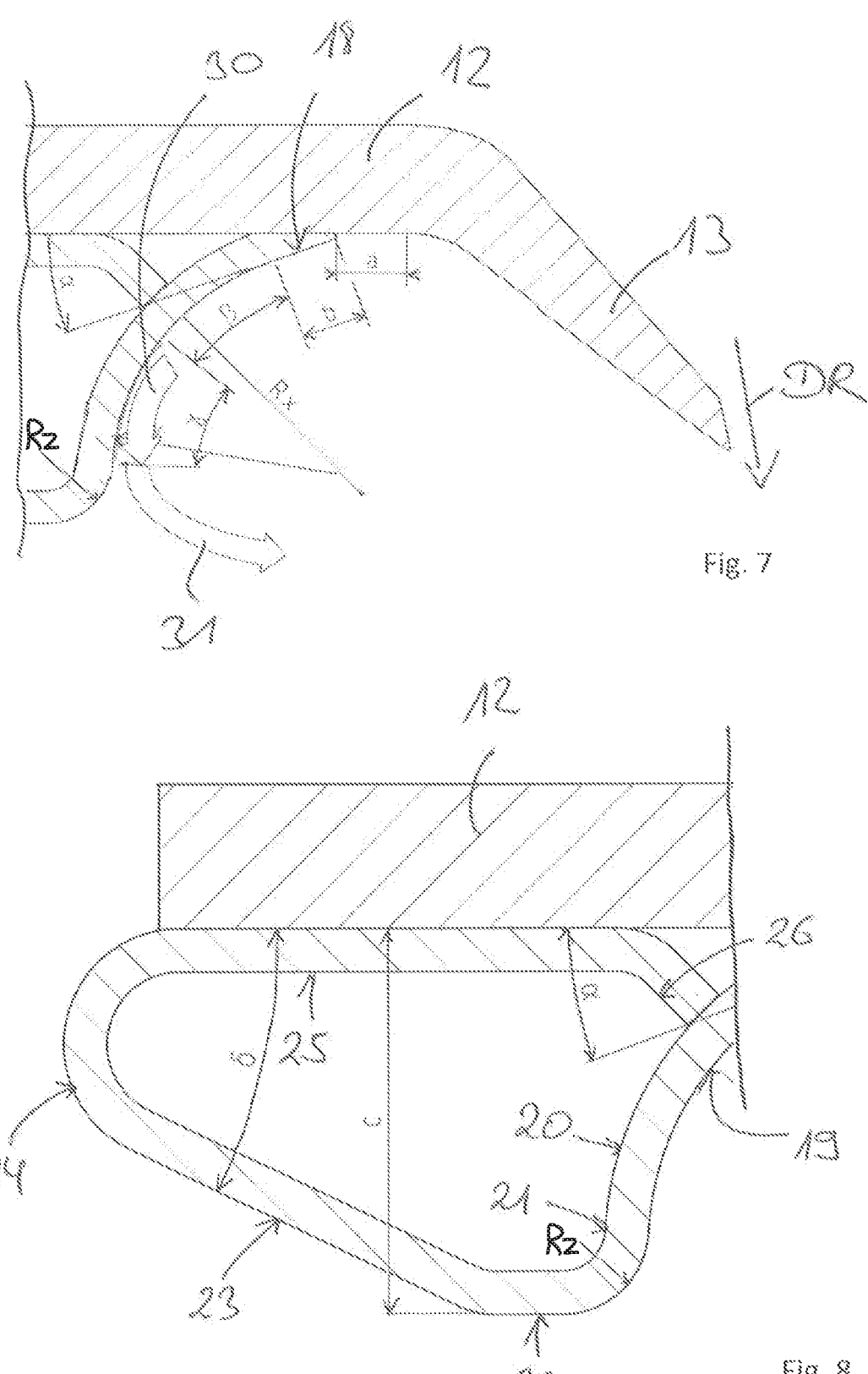
FIG. 7 shows the detail of FIG. 3 together with further crop flow arrows.
FIG. 8 shows a further detail from FIG. 2.
Figure 9:
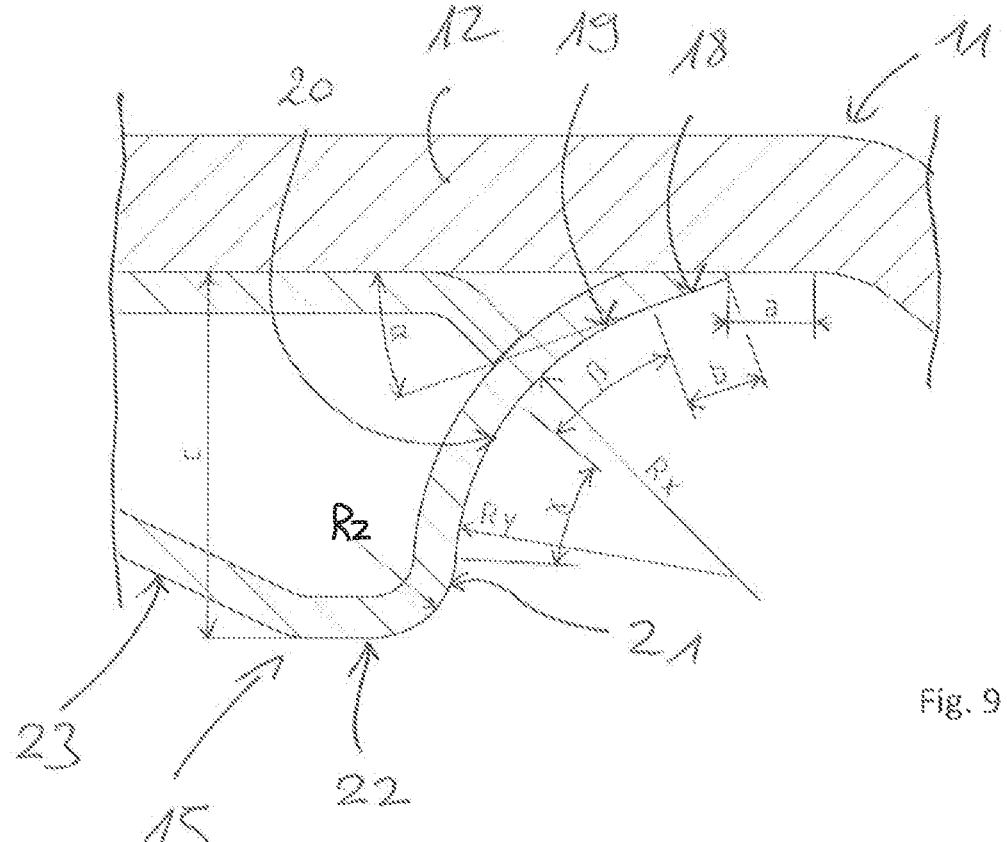
FIG. 9 shows a further detail from FIG. 2.

Subsequently, according to FIG. 7, the chopped harvested crop first of all passes in the direction of the arrows 30 and 31 into the third portion 20 of the guide surface 16 of the crop-guiding element 15, with the cut harvested crop being further deflected in the direction of rotation DR by means of the reduced radius Ry of the third portion 20. In the direction of the arrow 31, the chopped harvested crop leaves the drum turning circle owing to the rotational acceleration because of the centrifugal force.

The radius Rz of the fourth portion 21 extends in the opposite direction and prevents residues of the chopped harvested crop from accumulating in this region.

The crop-guiding element 15 prevents the chopped harvested crop from penetrating on the inner side of the chopping blade 10 too great a distance into the drum turning circle. This would lead to a delayed discharging of the harvested crop and thus to an extended circulation of the harvested crop. It is possible to prevent the harvested crop from rotating within the drum housing. Finally, the transport of the harvested crop is configured such that it can be undertaken efficiently with little requirement for energy.

The crop-guiding element 15 is preferably designed as a roll profiling element.

During roll profiling, a blank sheet for the crop-guiding element 15 is deformed and the surface thereof hardened. As a result, the crop-guiding element 15 has increased hardness and a low susceptibility to wear.

According to an advantageous development, the crop-guiding element 15 has a wear-protection coating at least on the first portion 18, second portion 19 and third portion 20. Such a wear-protection coating is preferably composed of a tungsten-carbide alloy which can be applied via laser powder build-up welding. The susceptibility of the crop-guiding element 15 to wear can thereby be further reduced.

The invention furthermore relates to a method for producing the above-described chopping blade 10. During the production of the chopping blade 10, first of all the basic body 11 which has the fastening portion 12 and the cutting portion 13, which is angled in relation to the fastening portion 12, is provided. This can be undertaken by the cutting portion 13 being bent over in relation to the fastening portion 12. Furthermore, at least one crop-guiding element 15 which is connected to the basic body 11 is provided. The crop-guiding element 15 is preferably deformed by roll profiling of a sheet metal blank made of steel and brought into the above-described contour consisting of the nine portions 18 to 26. The first portion 18, the second portion 19 and the third portion 20 of the crop-guiding element 15 are preferably coated here with a wear-protection coating, preferably with a tungsten-carbide alloy. The ninth portion 26 is preferably welded to the second portion 19.

LIST OF REFERENCE SIGNS

10 Chopping blade
11 Basic body
12 Fastening portion
13 Cutting portion
14 Transition edge
15 Crop-guiding element
16 Guide surface
17 Edge
18 first portion
19 second portion
20 third portion
21 fourth portion
22 fifth portion
23 sixth portion
24 seventh portion
25 eighth portion
26 ninth portion
27 Harvested crop guide
28 Harvested crop guide
29 Harvested crop guide
30 Harvested crop guide
31 Harvested crop guide

The invention claimed is:

1. A chopping blade (10) of a forage harvester,
having a basic body (11), which has a fastening portion (12) for fastening the chopping blade (10) to a chopping drum and a cutting portion (13) which is angled in relation to the fastening portion (12) and is configured for harvested crop to be chopped,
having at least one crop-guiding element (15) which is a roll profiling element and is fastened to the fastening portion (12) and is configured for guiding chopped harvested crop, wherein a guide surface (16) of said crop-guiding element has a contour which is curved at least in sections and begins at a distance from the one transition edge (14) between the fastening portion (12) and the cutting portion (13), characterized in that
a distance (a) between the beginning of the guide surface (16) of the at least one crop-guiding element (15) and the transition edge (14) between the fastening portion (12) and the cutting portion (13) of the basic body (11) is between 4 mm and 8 mm,
the guide surface (16) of the at least one crop-guiding element (15) runs rectilinearly adjacent to the beginning of said guide surface in a first portion (18) with a length (B) between 4 mm and 8 mm, wherein the first portion (18) of the at least one crop-guiding element (15) encloses an angle (α) between 18° and 22° with the fastening portion (12) of the basic body (11),
the first portion (18) of the at least one crop-guiding element (15) merges into a concavely curved second portion (19), the radius of curvature (Rx) of which is between 21 mm and 25 mm and which has a wrap angle (β) between 29° and 33°,
the second portion (19) of the at least one crop-guiding element (15) merges into a concavely curved third portion (20), the radius of curvature (Ry) of which is between 18 mm and 22 mm and which has a wrap angle (γ) between 24° and 28°,
the third portion (20) of the at least one crop-guiding element merges into a convexly curved fourth portion (21),
a maximum height (c) of the crop-guiding element (15) is between 24 mm and 30 mm starting from the fastening portion (12) of the basic body (11).

2. The chopping blade according to claim 1, characterized in that the fourth portion (21) of the at least one crop-guiding element (15) has a radius of curvature (Rz) between 5 mm and 7 mm, wherein the fourth portion (21) merges into a fifth portion (22) of the guide surface (16), which fifth portion runs parallel to the fastening portion (12) of the basic body (11) and defines the maximum height (c) of the crop-guiding element (15).

3. The chopping blade according to claim 2, characterized in that the fifth portion (22) of the at least one crop-guiding element (15) merges into a rectilinearly running sixth portion (23) which encloses an angle (8) between 23° and 27° with the fastening portion (12) of the basic body (11).

4. The chopping blade according to claim 3, characterized in that the at least one crop-guiding element (15) is closed by portions (24, 25, 26) adjoining the sixth portion (23).

5. The chopping blade according to claim 3, characterized in that the sixth portion (23) of the at least one crop-guiding element (15) merges into a convexly curved seventh portion (24) and the seventh portion (24) into a rectilinearly running eighth portion (25) which is adjacent to the fastening portion (12) of the basic body (11).

6. The chopping blade according to claim 5, characterized in that the eighth portion (25) of the at least one crop-guiding element (15) merges into a ninth portion (26) which makes contact with the second portion (19) of the respective crop-guiding element (15).

7. The chopping blade according to claim 6, characterized in that the eighth portion (28) is welded to the second portion (19).

8. The chopping blade according to claim 1, characterized in that the first portion (18), the second portion (19) and the third portion (20) of the at least one crop-guiding element (15) each bear a wear-protection coating.

9. The chopping blade according to claim 8, characterized in that the wear-protection coating is composed of a tungsten-carbide alloy.

10. A method for producing a chopping blade according to claim 1, having the following steps:

providing the basic body (11), which has the fastening portion (12) and the cutting portion (13) which is angled in relation to the fastening portion (12), providing the at least one crop-guiding element (15) by roll profiling a metal sheet, fastening the at least one crop-guiding element (15) to the basic body (11).

11. The method according to claim 10, characterized in that the at least one crop-guiding element (15) is coated with a wear-protection coating at least on the first portion (18), on the second portion (19) and on the third portion (20).

* * * * *